United States Patent [19]
Monahan et al.

[11] Patent Number: 6,071,206
[45] Date of Patent: Jun. 6, 2000

[54] TWO SPEED TRACTION DRIVE PULLEY SYSTEM

[75] Inventors: Russell E. Monahan, Ann Arbor; Jonathan M. Adler, Dexter; Randall King, Southfield; Scott A. Wojan, Novi, all of Mich.

[73] Assignee: NTN Corporation, Japan

[21] Appl. No.: 09/079,122

[22] Filed: May 14, 1998

[51] Int. Cl.[7] .................................................. F16H 15/00
[52] U.S. Cl. ........................ 475/154; 474/69; 475/187; 476/11
[58] Field of Search .................................. 475/187, 185, 475/318, 154; 474/69; 192/12 D; 476/3, 11

[56] References Cited

U.S. PATENT DOCUMENTS

| | | | |
|---|---|---|---|
| 1,737,295 | 11/1929 | Bronander | 475/187 |
| 2,266,164 | 12/1941 | Claytor . | |
| 2,327,769 | 8/1943 | Claytor . | |
| 2,375,785 | 5/1945 | Goode et al. . | |
| 2,883,611 | 4/1959 | Fuge . | |
| 2,998,539 | 8/1961 | Bessiere . | |
| 3,270,207 | 8/1966 | Stockton . | |
| 3,468,193 | 9/1969 | O'Mahony . | |
| 3,469,473 | 9/1969 | Forster et al. | 475/154 X |
| 4,706,520 | 11/1987 | Sivalingham | 475/154 X |
| 4,730,516 | 3/1988 | Kaneyuki . | |
| 5,122,099 | 6/1992 | Boedo et al. | 475/187 |
| 5,378,210 | 1/1995 | Teraoka | 475/318 X |
| 5,842,944 | 12/1998 | Morishita et al. | 475/154 |

*Primary Examiner*—Rodney H Bonck
*Attorney, Agent, or Firm*—Harness, Dickey & Pierce, P.L.C.

[57] ABSTRACT

A two speed pulley assembly comprised of a sheave, a brake member, an output member, and a brake. The sheave receives a rotational input and also includes a series of carrier arms which cooperate to define a circle which is coaxially with the sheave. Rollers are rotatably supported on said carrier arms. A braking member is rotatably supported relative to said sheave and includes portions defining a first raceway in contact with the rollers. An output sleeve is also rotationally supported relative to the sheave. The output sleeve includes portions defining a second raceway in contact with the rollers. The brake inhibits rotation of the braking member when engaged while permitting rotation thereof when disengaged. Mounted between the sheave and the output sleeve is a one-way clutch bearing. The clutch bearing engages when rotation of the sheave attempts to or begins to overrun rotation of the sleeve. During use, the sheave drives the output sleeve through the rollers at a rotational rate greater than that of the sheave when the brake is engaged. When the brake is disengaged, the sheave drives the output sleeve through the one-way clutch bearing at a one-to-one ratio. In this way the present invention provides two different driving speeds from a single belt pulley assembly thereby increasing the electrical output of an alternator at low engine speeds. Alternatively, the input and output member may be reversed to provide a speed reduction mechanism.

16 Claims, 2 Drawing Sheets

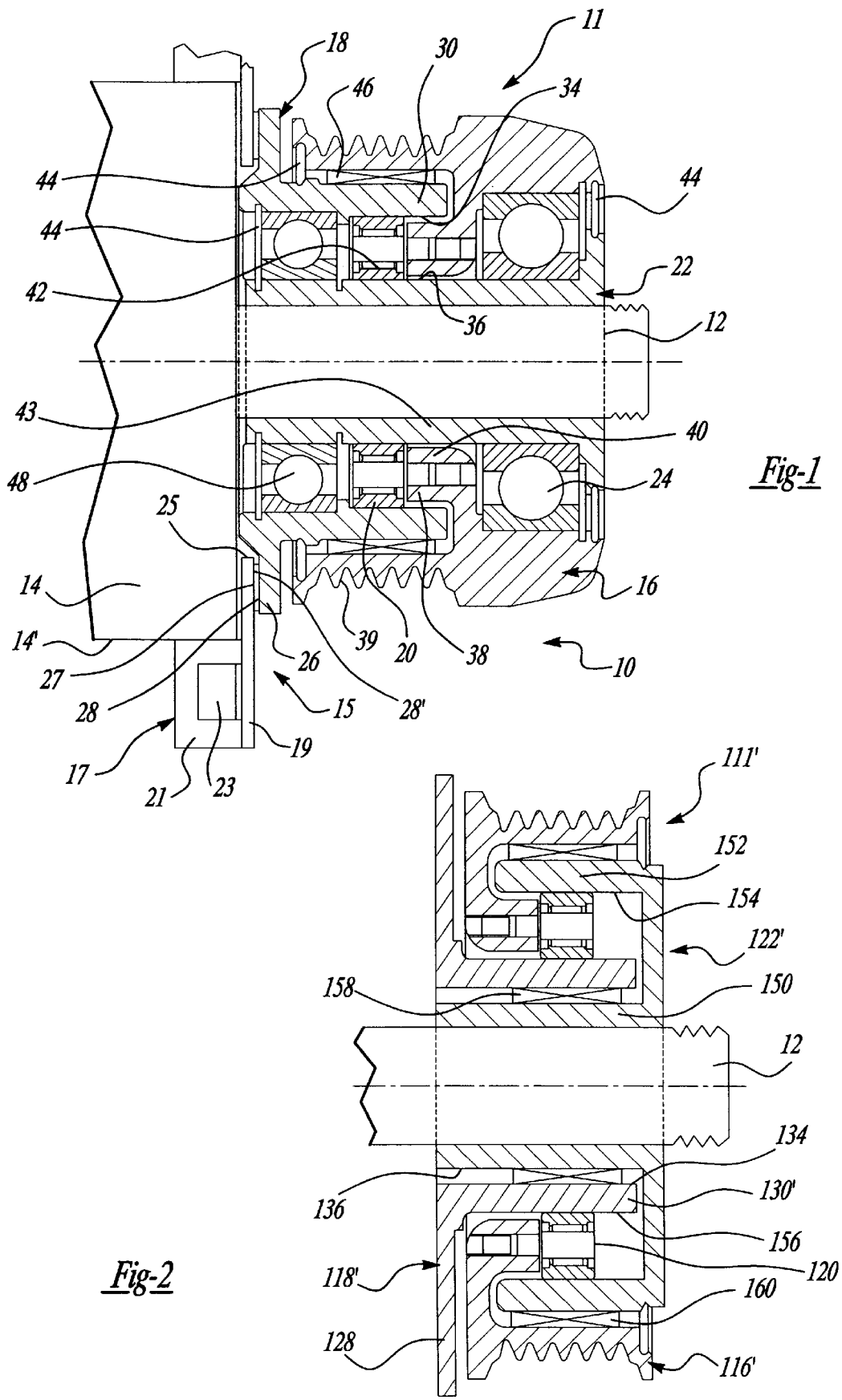

TWO SPEED TRACTION DRIVE PULLEY SYSTEM

BACKGROUND OF THE INVENTION

1. Field of the Invention

The present invention relates to a two speed pulley assembly. More specifically, the present invention relates to a two speed pulley assembly, controllable to provide two different drive speeds to an automotive accessory (such as an alternator) or industrial mechanism, having a novel traction drive mechanism.

2. Description of the Prior Art

Typically, a pulley used with an automotive accessory is of a one-piece design and is capable of only one possible drive speed ratio. A belt driven by the crank shaft of the engine drives the pulley. The belt provides a single drive speed which is based on the ratio of effective diameters of the driving (crankshaft) pulley and driven (alternator) pulley:

$$N_{alt} = N_{crank} \times (D_{crank}/D_{alt})$$

where:

$N_{alt}$=alternator speed $N_{crank}$=crankshaft speed $D_{crank}$=crankshaft pulley diameter $D_{alt}$=alternator pulley diameter Concerns with single speed systems arise when the engine and crankshaft are running at low or idle speeds. At such speeds, inadequate electrical output from the alternator can result, especially with the additional electrical loads (front and rear defrosters, electric seats, mirrors and windows, high intensity headlamps, etc. all working simultaneously) found in today's luxury cars. The current solution to this low alternator output has been to reduce the alternator pulley diameter. By reducing the alternator pulley diameter, the alternator is driven at a higher ratio and ultimately a higher top end speed. While concerns of inadequate output at low speeds are eliminated, excessive heat and noise are generated as are excessive wear and tear on the alternator bearings. While low electrical output conditions are only occasionally experienced, the problem is sufficient enough to prompt automotive companies into using more sophisticated pulleys and complex drive systems, with their associated higher cost, in an attempt to eliminate or further reduce the problem of low electrical output from the alternator.

Two speed systems that involve the use of two coupled alternator pulleys and two drive belts have been developed. Such systems typically feature a standard serpentine accessory drive belt and a second, clutchable, drive belt driven off of a second pulley, typically on one of the accessories (i.e. water pump). During normal operation, an electromagnetic clutch is disengaged, allowing the standard belt to drive the alternator through one of two coupled pulleys. In most cases, the alternator speed attained under this circumstance is somewhat lower than the corresponding speed of a single speed alternator. This is because the diameter of that portion of the pulley driven by the standard belt is usually larger than the diameter of a standard, single belt pulley. This diameter change lowers peak alternator speeds.

At low engine speeds, an electromagnetic clutch is actuated to drive the second drive pulley and belt. The belt in turn drives the alternator's second pulley, located outboard or axially further from the alternator itself. This second alternator pulley has a diameter which is smaller than the first pulley. By virtue of this smaller diameter, the outboard alternator pulley spins faster, overdriving the larger first pulley via a one-way clutch. This provides a higher alternator drive ratio.

By choosing the appropriate diameters for the crank pulley, second drive pulley, and the coupled alternator pulleys, a suitable higher alternator speed can be achieved, one which provides greater electrical output at low engine speeds. Unfortunately, such a system is expensive in that it requires not only an electromagnetic clutch, but also a second belt, a second tensioner, a second drive pulley and the two coupled driven pulleys. For certain applications, the added expense will prove prohibitive.

Another limitation with the above two-belt type of system is that the coupled driven pulleys form an assembly having an axial length that may not fit in existing engine compartments and may require expensive and complicated packaging changes within the engine compartment. Because of this length increase and the additional belt load on the outboard pulley, the moment load on the front alternator bearing increases, typically requiring a larger bearing to be specified in such applications. Such a bearing change would also require significant design changes to the alternator itself, increasing cost and preventing commonality between parts.

In view of the foregoing limitations and disadvantages of the prior art devices, as well as other disadvantages not specifically mentioned above, it should be apparent that there still exists a need in the art for an improved pulley system which offers better electrical output from the alternator at low engine speeds and reduced peak alternator speeds at high engine speeds, while minimizing overall packaging requirements and system costs.

It is therefore a primary object of this invention to fulfill that need by providing a two speed pulley assembly capable of sufficiently driving an automobile accessory, such as an alternator, at low engine speeds.

It is a further object of the present invention to provide a two speed pulley assembly having minimal packaging requirements enabling it to be positioned within the typical space requirements of a standard, single speed pulley.

Another object of the present invention is to reduce the moment load on the front alternator bearing, compared with a two-belt system, to allow existing alternators to be used.

It is another object of the present invention to provide a two speed pulley assembly that is less expensive to produce than current two belt pulley systems.

Still another object of the present invention to provide a two speed pulley assembly that reduces wear and tear on the overall system by limiting the output speed of the pulley assembly at high engine speeds.

SUMMARY OF THE INVENTION

Briefly described, these and other objects are accomplished according to the present invention by providing a two speed pulley assembly that operates off of a single drive belt and is designed to fit directly on the input shaft of an accessory. Hereafter, the two speed pulley assembly will be described only in connection with an alternator. It being understood that such use of the term is in no way intended to limit the scope of the present invention. As referred to herein, the pulley assembly is termed a two speed traction drive pulley assembly.

The two speed traction drive pulley assembly is basically comprised of a pulley assembly having a planetary drive mechanism including a pulley sheave with a set of carrier arms integral therewith. The planets of the drive mechanism are cylindrical rollers mounted via bearings onto the carrier arms. With a suitable amount of interference to provide the necessary traction for driving the mechanism, the rollers contact the inner race which is a portion of an output sleeve which mounts onto the input shaft of the alternator. The rollers contact as their outer race a surface of a braking ring. A flange on the braking ring is coupled to a brake rotor that is engageable with the electromagnetic coil of a brake to stop rotation of the brake ring. The coil of the brake may be located on the outboard or front face of the alternator or even outboard of the pulley itself. A one-way clutch bearing is mounted between the pulley sheave nod the inner race/output sleeve while another bearing acts in concert with the rollers to support the brake ring.

During operation, a rotating drive belt positioned in the pulley sheave causes rotation of the sheave. At high engine speeds the electromagnetic brake is disengaged. As the sheave rotates, it engages the one-way clutch bearing, driving the sleeve and alternator directly.

At low engine speeds, the electromagnetic brake is engaged, locking up the braking ring and therefore one of the races. With the braking ring stopped, the rollers are forced to rotate about their carrier arms themselves at a rate higher than the sheave. This occurs because of the minimal amount of slipping at the contact points between the rollers and the brake ring. With the rollers being forced to rotate at a high rate, the sleeve, and therefore the alternator's input shaft, is also forced to rotate at a higher rate than it would if the brake was not engaged and the sleeve was not clutched.

In the above manner, the present invention provides a two speed capability in a one belt system to allow the alternator to be driven at higher speeds during low engine speed conditions, thereby providing the necessary higher electrical output demanded from the alternator. Whenever the vehicle's computer control senses low electrical system output, and/or a low engine speed, the electromagnetic brake can be energized to improve performance of the electrical system.

This present mechanism is attached directly to the alternator shaft and does not require a second drive belt, tensioner or extra pulleys. Utilizing a single drive belt in the immediate vicinity of the alternator, the present invention does not require changes in the front alternator bearing or the engine compartment sheet metal or packaging. With the above attributes, the present invention provides a considerable cost savings over two belt systems.

Additional benefits and advantages of the present invention will become apparent to those skilled in the art to which the present invention relates from the subsequent description of the preferred embodiment and the appended claims, taken in conjunction with the accompanying drawings.

BRIEF DESCRIPTION OF THE DRAWINGS

FIG. 1 is a cross-sectional view of a preferred embodiment of the present invention when attached to the input shaft of an alternator;

FIG. 2 is a cross-sectional view of a second embodiment of the present invention;

DETAILED DESCRIPTION OF THE PREFERRED EMBODIMENT

Figure 3:
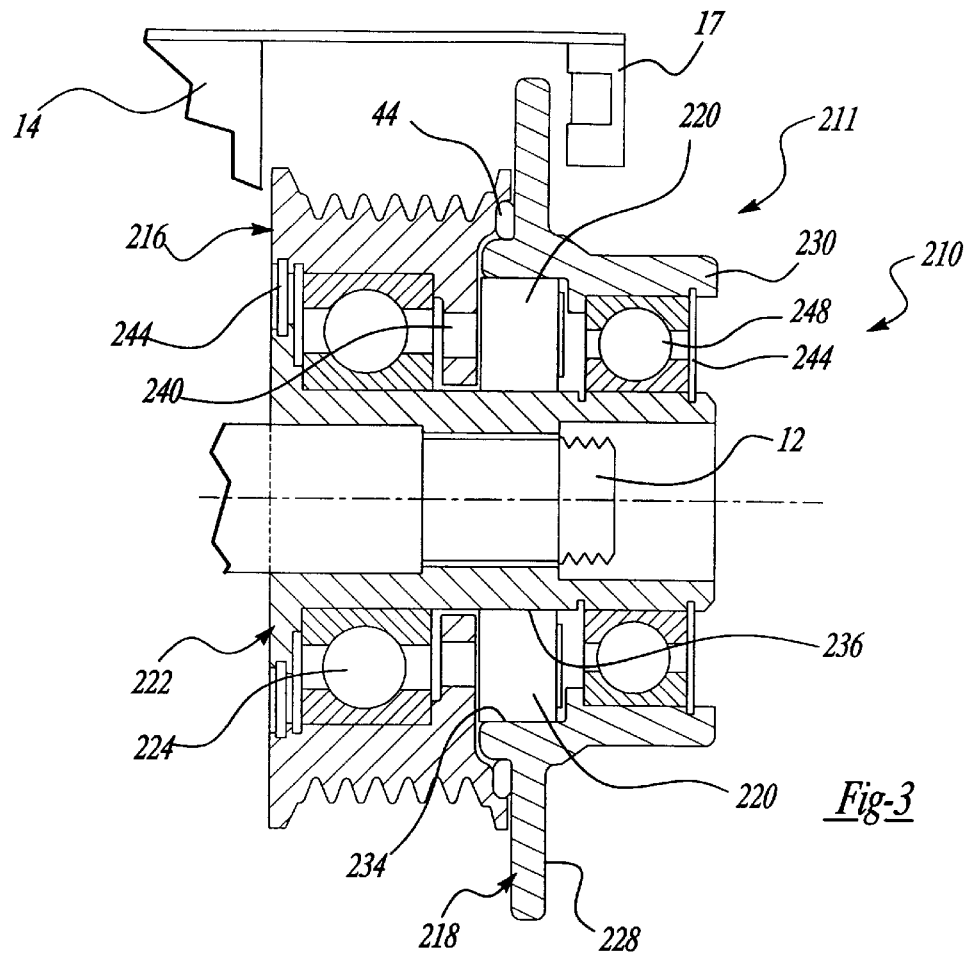
FIG. 3 is a cross-sectional view of a third embodiment of the present invention.

Referring now in detail to the drawings, seen in FIG. 1, and generally designated at 10, is a preferred embodiment of the present traction drive pulley assembly. The pulley assembly 10 includes a traction drive pulley 11 which is secured by conventional methods to an input shaft 12 of an alternator 14. The traction drive pulley 10 generally includes a sheave 16, a braking ring 18, multiple planetary rollers 20, an output sleeve 22, and a one-way clutch bearing 24. The assembly 10 also includes a brake mechanism 15 having an electromagnetic coil 17 mounted directly to the alternator 14.

The electromagnetic coil 17 of the preferred embodiment is fitted to the outer circumferential surface 14' of the alternator 14 to minimize the overall axial length of the assembly 10. Bearing in mind that various alternate designs/constructions are possible, in the illustrated embodiment, the electromagnetic coil 17 includes a U-shaped channel 21 with a multiple turn coil winding 23 of thin electrical wire located within the channel 21. The inner and outer edges of the channel 21 extend axially beyond the level of the winding 23 to provide a pair of surfaces that can contact and thereby restrain a brake rotor 19 when the appropriate current is fed through the coil winding 23. Alternatively, the braking mechanism 15 could be actuated by vacuum, air pressure, band clutch, or a similar mechanism.

The brake rotor 19 is generally a flat sheet of ferrous material of roughly the same diameter as the electromagnetic coil 17. An aperture 25 is located in the center of the rotor 19 allowing the alternator's input shaft 12 to pass through the rotor 19. Three or more spring bands 27 are loosely connected between the outboard axial surface 28' of rotor 19 and the back axial face 28 of a braking flange 26 on the braking ring 18 to provide flexibility of movement of the rotor 19 during engagement of the brake mechanism 15.

When the electromagnetic coil 17 is energized, the magnetic flux generated in the coil's U-shaped channel 21 attracts the rotor 19 and contact between the rotor 19 and edges of the channel 21 cause the two components to bind tightly, stopping rotation of the rotor 19 and the braking ring 18.

The braking ring 18 further includes a cylindrical extension 30, which is concentric and coaxial with the sleeve 22. In the present embodiment, the extension 30 is located radially outward of the sleeve 22. An inner surface 34 of the extension 30 is hardened and polished and contacts the rollers 20 mentioned above thereby operating to define an outer race. The braking ring 18 functions as the stationary ring in the planetary drive and the rollers 20 roll along the inner surface 34.

The rollers 20 are supported on pins 38 which are received in bores of carrier arms 40 formed with pulley sheave 16. Alternately, the pins 38 can be unitarily formed with the carrier arms 40 and the sheave 16. The ends of the carrier arms 40 are accordingly positioned radially inward of the cylindrical extension 30. The rollers 20 themselves are tubes, hollow rollers or rings with a rolling contact bearing 42 on their interior. To reduce overall cost, the rollers 20 are preferably standard components such as bearings or cam rollers. On an exterior surface of the sheave 16 is formed a series of ribs 39 or similar means for receiving and engaging a drive belt (not shown) which drives the pulley assembly 10.

The sleeve 22 includes a cylindrical section 43 which engages the input shaft 12 of the alternator 14. To ensure solid mounting, the sleeve 22 can be keyed to the input shaft 12, press-fit onto the input shaft 12, kept in place with an external nut or provided with threads on its interior bore to engage threads on the alternator input shaft 12. In the latter embodiment, a male or female hex or square drive can be included in the outboard end of the sleeve 22 to facilitate attachment. The purpose of the sleeve 22 is to provide an interface with the input shaft 12 and, as will be explained shortly, it also acts as the output member of the traction drive pulley assembly 10.

The inner surface 23 of the one-way clutch bearing 24 mentioned above is press-fit onto the outer surface 36 of the outboard end of the sleeve 22. A support bearing 48 is fit onto the opposing end of the sleeve 22. The surface 36 of the sleeve 22 between the clutch bearing 24 and the support bearing 48 is hardened and ground to provide an inner race that is contacted by the rollers 20.

The one-way clutch bearing 24 is preferably a standard, commercially available unit, or is of a design directly incorporated into the sheave 16 and sleeve 22. In a preferred embodiment, the clutch bearing 24 consists of four major components: balls, sprags, retainer and springs. The balls and sprags are conventionally spaced alternately around and between the bearing raceways. If desired, the sprags can be placed together in pairs to provide higher lock-up torque capacity. The balls provide low friction rotational movement and the retainer, which can be made of low cost plastic, is has cavities for closely holding the balls, sprags and springs. The springs urge the sprags uniformly in one direction and thereby determine the rotational direction of lock-up for the clutch bearing 24. The springs can be of standard coil design or a low cost stamped design. Sufficient torque capacity is necessary to endure the high acceleration rates experienced during engine start-up. It should be noted that the particular construction of the clutch bearing 24 is not critical to the present invention and other constructions of a clutch bearing 24 may be employed. These versions include, but are not limited to, a needle roller clutch, a roller/ramp clutch, a ball/ramp clutch and a wrap spring clutch.

During use, the purpose of the braking ring 18 is to act as the stationary member of the traction drive pulley 11. When the braking ring 18 is held stationary by the coil 17, the traction drive is engaged, producing an increased output speed from the pulley 11. As mentioned above, braking ring 18 has a cylindrical extension 30 which is coaxial with the sleeve 22 and which acts as the outer contact surface for the rollers 20. When the coil 17 is actuated, the sheave 16 and carrier arms 40 are rotating and the braking ring 18 is stationary. The carrier arms 40 then force the rollers 20 to rotate in the space between the inner surface 34 of the braking ring 18 and the outer surface 36 of the sleeve 22. The friction resulting because of the interference fit between the rollers 20, the braking ring 18 and the sleeve 22 prevents the rollers 20 from slipping. As a result, the rollers 20 rotate around their central axes on the pins 38 attached to the carrier arms 40 and are forced to turn on the inner surface 34 of the braking ring 18. The rollers 20 in turn contact the outer surface 36 of the sleeve 22 and force it to rotate at a higher speed than the input from the sheave 16. The tangential speed of the roller 20 at the contact point with the inner surface 34 of the braking ring 19 is zero, while the speed at the opposite side of the roller 20, the point in contact with the outer surface 36 of the sleeve 22 is N4πr (where N=rotational speed of the pulley 16 and r=radius of the roller 20). This tangential speed is transmitted to the sleeve 22, rotating it in the same direction as the sheave 16 is turning, but at a higher speed. The sleeve 22 then drives the input shaft 12 of the alternator 14. Because friction at the above contact points is so important, normal lubricants are not optimal for this system. Instead, traction lubricants such as the "SantoTrac" line of fluids and greases (manufactured by Findett Corporation) provide the best overall performance. By using such lubricants, a hydrodynamic film develops between the rollers 20 and the inner and outer surfaces 34 and 36 during operation.

With the brake 15 being engaged at low engine speeds, the main effect is that the alternator 14 will be driven at higher speeds during those conditions of low engine speed. This enables the alternator to provide a higher electrical output at engine idle, while reducing peak alternator speed, noise and wear on the alternator bearings which could occur if just a smaller single speed pulley were used. When fully developed, the rollers 20 no longer contact the inner and outer surfaces 34 and 36, being separated by the film, but torque is transferred therethrough. This has the added benefit of further reducing wear.

At higher engine speeds, the coil 17 is not energized and the braking ring 18 is free to rotate. With the braking ring 18 free to rotate, when the rotational speed of the sheave 16 approaches and equals that of the sleeve 22, the one-way clutch bearing 24 engages, preventing the sleeve 22 from rotating slower than the sheave 16 and providing a direct transfer of torque from the sheave 16 to the sleeve 22 and to input shaft 12.

Seals 44 are provided to keep lubricants in and contaminants out of the traction drive pulley assembly 10. Seals 44 are provided between the sleeve 22 and sheave 16, between the sleeve 22 and the braking ring 18, and between the sheave 16 and braking ring 18.

To further support the various components of the assembly 10, a needle or roller bearing 46 can optionally be positioned between the outer surface of the braking ring's extension 30 and an inner surface of the sheave 16. Another bearing 48 is located internally of the extension 30 to provide support against the sleeve 22 and can be made integral to extension 30 and sleeve 22. These bearings 46 and 48 are of standard construction and simply allow relative rotation between the sheave 16, braking ring 18 and sleeve 22. Alternatively, the bearing 48 can be integral with the extension 30 and the sleeve 22.

A second embodiment of the traction drive pulley 111 is shown in FIG. 2. In this embodiment, the sleeve 122 includes an inner cylindrical portion 150 (which is keyed or otherwise engaged with the input shaft 12) and an outer cylindrical portion 152. The outer cylindrical portion 152 includes an inner cylindrical surface 154 which operates as the outer race for the rollers 120. The braking ring 118 includes a cylindrical extension 130, similar to that described previously. However, the extension 130 includes an outer surface 156 which operates as the inner race for the rollers 120. The sheave 116 functions as described previously, providing the rotating input for the pulley 111.

Whereas the inner race defined by the sleeve's outer surface 36 was driven by the rollers 20 in the previous embodiment, in this alternative arrangement it is now an outer race which is defined by the inner surface 154 of the sleeve's outer portion 152. Likewise, the stationary member in the previous embodiment was the outer race defined by the braking ring's inner surface 34. In this embodiment, the inner race is defined by the outer surface 156 of the braking ring's extension 130. As in the previous embodiment, the braking ring 118 includes an axial face 128 coupled with a brake rotor (not shown).

A support bearing 158 is located between the outer surface 136 of the axial extension 150 of the sleeve 122 and the inner surface 134 of extension 130 of the braking ring 18'. Additionally, the ball/sprag clutch bearing 24 of the prior embodiment is replaced by a needle roller clutch bearing 160 between the sheave 116 and sleeve 122. The functions of the clutch bearing 160 remains, however, essentially identical to the prior embodiment.

A third embodiment of the two speed traction drive pulley assembly 210 of the present invention is illustrated in FIG. 3. In this third embodiment, the pulley 211 is similar to the pulley 11 of the first embodiment in that the inner race defined by the outer surface 236 of a sleeve 222 is driven by the rollers 220. The rollers 220 are again supported by carrier arms 240 of the pulley sheave 216. The sheave 216, however, has been repositioned so that it is located axially inboard (toward the alternator 14) of the braking ring 218. By locating the sheave 216 closer to the alternator 14, it is possible to reduce the loads encountered by the bearing 248 and the clutch bearing 224, to increase heat transfer from the braking ring 218, to increase air flow to the alternator 14 and to reduce the moment load on the front alternator bearing. As with the first embodiment, when the braking ring 218 is stopped by the electromagnetic coil 17, the rollers 220 are forced to roll along the outer race defined by the inner surface 234 of the braking ring 218. As a result, the sleeve 222 is again driven by the rollers 220 and torque is transferred to the input shaft 12.

The one-way clutch bearing 224 is designed to permit the sleeve 22 to rotate faster than the sheave 16. Accordingly, when the braking ring 218 is engaged (i.e. during low engine speeds) the clutch bearing 224 is disengaged and the sleeve 22 is driven by the rollers 20 at a rate faster than rotation of the sheave 216. When the braking ring 218 is disengaged and fully rotating (i.e. during high engine speeds) the clutch bearing 224 engages to prevent the sleeve 222 from rotating slower than the sheave 216. Upon engagement of the clutch bearing 224, torque is transferred directly from the sheave 216 to the sleeve 222 and the input shaft 12.

Figure 4:
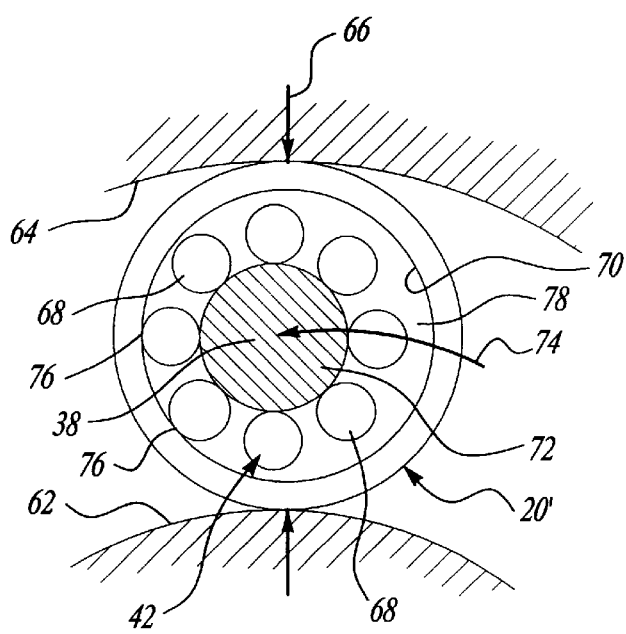
FIG. 4 is a cross-sectional view through a roller according to another aspect of the invention.

In all of the above embodiments, since there must be an interference fit between the rollers, the braking ring, and the sleeve, this inherently causes the planetary rollers 20 to carry a preload, as generally designated at 66 in FIG. 4. To keep the rollers 20, and more specifically the rolling elements 68 located within the rollers 20, from carrying the preload 66 and to reduce the contact force fluctuations which occur as a result of the parts heating and cooling, an internal clearance is provided between the rolling elements 68 and an outer race 70 of the planetary rollers 20. An inner race 72 of the planetary rollers 20 engages the rolling elements 68. When the rotation of the carrier arms 40 causes movement of the planetary rollers 20 between the "sun" 62 and outer ring 64 in the direction generally designated by arrow 74, the rolling elements 68 are caused to contact the outer race 70 of the rollers 20 on the leading side of the planetary roller 20, relative to the direction of rotation 74. This contact between the rolling elements 68 and the outer race 70 of the rollers 20 is generally designated at 76 while the clearance seen on the trailing side is generally designated at 78. In such a construction, the rollers 20 and the rolling elements 68 and pins 38 are integrally constructed with one another.

While described above in connection with an automotive application, this invention could also be applied to any low torque, two speed device, such as dishwashers, record players, etc.

While the above description constitutes the preferred embodiment of the present invention, it will be appreciated that the invention is susceptible to modification, variation and change without departing from the proper scope and fair meaning of the accompanying claims.

We claim:

1. A two speed pulley assembly for receiving a rotational input from a belt and for rotationally driving an input shaft of a device, said assembly comprising:

a sheave having a belt engaging portion for receiving the rotational input from the belt, said pulley sheave also having a plurality of carrier arms cooperating to define a circle being coaxial with said outer portion;

a plurality of rollers rotatably supported on said carrier arms, said rollers being cylindrical and having a smooth exterior surface;

a braking member rotatably supported relative to said sheave, said braking member including a generally smooth circumferential surface defining a first raceway in contact with said exterior surface of said rollers;

an output member rotatably supported relative to said sheave, said output member including a generally smooth circumferential portion defining a second raceway in contact with said exterior surface of said rollers, said second raceway being coaxial with said first raceway;

a brake, said brake inhibiting rotation of said braking member when engaged and permitting rotation of said braking member when disengaged;

a one-way clutch bearing mounted between said sheave and said output member, said clutch bearing preventing rotational speed of said sheave from being greater than rotational speed of said output member;

whereby said sheave drives said output member through said rollers at a rotational rate greater than that of said sheave when said brake is engaged and said sheave drives said output member through said clutch bearing at a one to one ratio when said brake is disengaged.

2. The two speed pulley assembly of claim 1 wherein said first raceway defines an outer raceway and said second raceway defines an inner raceway.

3. The two speed pulley assembly of claim 1 wherein said first raceway defines an inner raceway and said second raceway defines an outer raceway.

4. The two speed pulley assembly of claim 1 wherein said rollers are provided between said first and second raceways in an interference fit.

5. The two speed pulley assembly of claim 1 wherein said output member includes a generally cylindrical sleeve having surfaces defining a bore therethrough to receive the input shaft of the device, said second raceway being defined by an outer circumferential surface of said sleeve.

6. The two speed pulley assembly of claim 1 wherein said braking member includes a generally cylindrical portion having an inner circumferential surface defining said first raceway.

7. The two speed pulley assembly of claim 1 wherein said output member includes coaxial inner and outer portions, said inner portion having surfaces defining a bore therethrough to receive the input shaft of the device, said outer portion including an inner circumferential surface defining said second raceway.

8. The two speed pulley assembly of claim 1 wherein said braking member includes a portion extending between said inner and outer portions of said output member.

9. The two speed pulley assembly of claim 1 wherein said braking member includes a brake rotor, said brake rotor being axially moveable and engageable by said brake to thereby stop rotation of said brake member.

10. The two speed pulley assembly of claim 1 further comprising an inboard side and an outboard side, said inboard side being adjacent to the device when said assembly is mounted to the input shaft thereof, said brake member being located inboard of said sheave.

11. The two speed pulley assembly of claim 1 wherein said carrier arms are located radially inward of said outer portion.

12. A two speed pulley assembly for receiving a rotational input and for rotationally driving an input shaft of a device, said assembly comprising:

a sheave having an outer portion for receiving the rotational input, said pulley sheave also having a carrier portion and plurality of carrier arms, said carrier arms cooperating to generally define a circle coaxially with said outer portion;

a plurality of rollers rotatably supported on said carrier arms;

a braking member rotatably supported relative to said sheave, said braking member including portions defining a first raceway in contact with said rollers;

an output member rotatable supported relative to said sheave, said output member including portions defining a second raceway in contact with said rollers, said second raceway being coaxial with said first raceway;

a brake, said brake including an electromagnetic coil having portions engageable with said brake member to thereby stop rotation of said brake member, said brake inhibiting rotation of said braking member when engaged and permitting rotation of said braking member when disengaged;

a one-way clutch bearing mounted between said sheave and said output member, said clutch bearing preventing rotation speed of said sheave from being greater than rotation speed of said output member;

whereby said sheave drives said output member through said rollers at a rotational rate greater than that of said sheave when said brake is engaged and said sheave drives said output member through said clutch bearing at a one-to-one ratio when said brake is disengaged.

13. A two speed pulley assembly for receiving a rotational input and for rotationally driving an input shaft of a device, said assembly comprising:

an inboard side and an outboard side, said inboard side being adjacent to the device when said assembly is mounted to the input shaft thereof;

a sheave having an outer portion for receiving the rotational input, said pulley sheave also having a carrier portion and plurality of carrier arms, said carrier arms cooperating to generally define a circle coaxially with said outer portion;

a plurality of rollers rotatably supported on said carrier arms;

a braking member rotatably supported relative to said sheave, said braking member including portions defining a first raceway in contact with said rollers, said braking member being located outboard of said sheave;

an output member rotatably supported relative to said sheave, said output member including portions defining a second raceway in contact with said rollers, said second raceway being coaxial with said first raceway;

a brake, said brake inhibiting rotation of said braking member when engaged and permitting rotation of said braking member when disengaged;

a one-way clutch bearing mounted between said sheave and said output member, said clutch bearing preventing rotation speed of said sheave from being greater than rotation speed of said output member;

whereby said sheave drives said output member through said rollers at a rotational rate greater than that of said sheave when said brake is engaged and said sheave drives said output member through said clutch bearing at a one-to-one ratio when said brake is disengaged.

14. A two speed pulley assembly for receiving a rotational input and for rotationally driving an input shaft of a device, said assembly comprising:

a sheave having an outer portion for receiving the rotational input, said pulley sheave also having a carrier portion and plurality of carrier arms, said carrier arms cooperating to generally define a circle coaxial with said outer portion;

a plurality of rollers rotatably supported on said carrier arms, said rollers being supported on said carrier arms by rolling element bearings, said rollers including generally cylindrical outer and inner rings, said rolling element bearings being located between said outer and inner rings and being retained in contact with said inner ring, a clearance being provided between said roller bearings and said outer ring when said pulley assembly is stationary, at least some of said roller bearings contacting said outer ring when said sheave is rotating;

a braking member rotatably supported relative to said sheave, said braking member including portions defining a first raceway in contact with said rollers;

an output member rotatably supported relative to said sheave, said output member including portions defining a second raceway in contact with said rollers, said second raceway being coaxial with said first raceway;

a brake, said brake inhibiting rotation of said braking member when engaged and permitting rotation of said braking member when disengaged;

a one-way clutch bearing mounted between said sheave and said output member, said clutch bearing preventing rotation speed of said sheave from being greater than rotation speed of said output member;

whereby said sheave drives said output member through said rollers at a rotational rate greater than that of said sheave when said brake is engaged and said sheave drives said output member through said clutch bearing at a one-to-one ratio when said brake is disengaged.

15. A two speed pulley assembly for receiving a rotational input and for rotationally driving an input shaft of a device, said assembly comprising:

a sheave having an outer portion for receiving the rotational input, said pulley sheave also having a carrier portion and plurality of carrier arms, said carrier arms cooperating to generally define a circle coaxial with said outer portion;

a plurality of rollers rotatably supported on said carrier arms;

a braking member rotatably supported relative to said sheave, said braking member including portions defining a first raceway in contact with said rollers;

an output member rotatably supported relative to said sheave, said output member including portions defining a second raceway in contact with said rollers, said second raceway being coaxial with said first raceway;

a hydrodynamic film separating said rollers from at least one of said first and second raceways;

a brake, said brake inhibiting rotation of said braking member when engaged and permitting rotation of said braking member when disengaged;

a one-way clutch bearing mounted between said sheave and said output member, said clutch bearing preventing rotation speed of said sheave from being greater than rotation speed of said output member;

whereby said sheave drives said output member through said rollers at a rotational rate greater than that of said sheave when said brake is engaged and said sheave drives said output member through said clutch bearing at a one-to-one ratio when said brake is disengaged.

16. A two speed pulley assembly for receiving a rotational input from an input shaft and for rotationally driving a belt of a device, said assembly comprising:

a sheave having a belt engaging portion for providing rotational output to the belt, said pulley sheave also having a plurality of carrier arms cooperating to define a circle being coaxial with said outer portion;

a plurality of rollers rotatably supported on said carrier arms, said rollers being cylindrical and having a smooth exterior surface;

a braking member rotatably supported relative to said sheave, said braking member including a generally smooth circumferential surface defining a first raceway in contact with said exterior surface of said rollers;

an input member rotatably supported relative to said sheave, said input member including a generally smooth circumferential portion defining a second raceway in contact with said exterior surface of said rollers, said second raceway being coaxial with said first raceway;

a brake, said brake inhibiting rotation of said braking member when engaged and permitting rotation of said braking member when disengaged;

a one-way clutch bearing mounted between said sheave and said input member, said clutch bearing preventing rotational speed of said input member from being less than rotational speed of said sheave;

whereby said input member drives said sheave through said rollers at a rotational rate less than that of said input member when said brake is engaged and said input member drives said sheave through said clutch bearing at a one to one ratio when said brake is disengaged.

* * * * *

UNITED STATES PATENT AND TRADEMARK OFFICE
CERTIFICATE OF CORRECTION

PATENT NO. : 6,071,206  
APPLICATION NO. : 09/079122  
DATED : June 6, 2000  
INVENTOR(S) : Monahan et al.

Page 1 of 1

It is certified that error appears in the above-identified patent and that said Letters Patent is hereby corrected as shown below:

Column 5, line 23, after "plastic," delete "is".

Signed and Sealed this

Seventh Day of November, 2006

JON W. DUDAS  
*Director of the United States Patent and Trademark Office*